United States Patent
Dick et al.

(10) Patent No.: US 6,826,411 B2
(45) Date of Patent: Nov. 30, 2004

(54) LOW POWER INTERFERENCE SIGNAL CODE POWER (ISCP) MEASUREMENT

(75) Inventors: Stephen G. Dick, Nesconset, NY (US); Marian Rudolf, Montreal (CA); Joseph S. Levy, Merrick, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 95 days.

(21) Appl. No.: 10/325,805

(22) Filed: Dec. 19, 2002

(65) Prior Publication Data

US 2004/0198407 A1 Oct. 7, 2004

Related U.S. Application Data

(60) Provisional application No. 60/391,803, filed on Jun. 27, 2002.

(51) Int. Cl.[7] .................................................. H04Q 7/20
(52) U.S. Cl. ...................... 455/522; 455/450; 455/464; 455/509; 370/335; 370/336
(58) Field of Search ............................. 455/452.2, 423, 455/574, 522, 517, 68, 69, 37, 513, 509, 524, 450, 464, 451, 452.1, 453, 63.1; 370/337, 280–281, 291, 320; 325/130, 146; 320/335, 336, 329, 330, 347, 337

(56) References Cited

U.S. PATENT DOCUMENTS

| | | | |
|---|---|---|---|
| 6,333,920 B1 | 12/2001 | Nguyen et al. | |
| 6,546,252 B1 | 4/2003 | Jetzek et al. | |
| 6,591,109 B2 | 7/2003 | Pan | |
| 6,704,286 B2 * | 3/2004 | Zeira et al. | 370/241 |
| 6,714,523 B2 * | 3/2004 | Zeira et al. | 370/320 |
| 2002/0015393 A1 | 2/2002 | Pan et al. | |
| 2002/0031105 A1 * | 3/2002 | Zeira et al. | 370/337 |
| 2002/0181550 A1 | 12/2002 | Zeira et al. | |
| 2003/0086380 A1 * | 5/2003 | Kim et al. | 370/280 |
| 2003/0086394 A1 * | 5/2003 | Zeira et al. | 370/331 |

FOREIGN PATENT DOCUMENTS

| | | | |
|---|---|---|---|
| CN | 1329789 | 10/2002 | |
| EP | 1176730 A1 * | 1/2002 | .......... H04B/1/707 |
| JP | 2003032168 | 1/2003 | |
| WO | WO02093757 | 11/2002 | |

\* cited by examiner

*Primary Examiner*—Pablo N. Tran
(74) *Attorney, Agent, or Firm*—Volpe and Koenig, P.C.

(57) ABSTRACT

An interference signal code power (ISCP) measurement is estimated in a time division multiple access/code division multiple access communication system. Signals transmitted in a particular time slot are received. A power level of the transmitted received signals of the particular time slot is measured. An association of ISCP values with measured power levels is provided. The measured power level is used to estimate an ISCP value. The estimated ISCP value is associated with that measured power level.

18 Claims, 2 Drawing Sheets

LOW POWER INTERFERENCE SIGNAL CODE POWER (ISCP) MEASUREMENT

CROSS REFERENCE TO RELATED APPLICATION

This application claims priority from U.S. provisional application No. 60/391,803, filed Jun. 27, 2002, which is incorporated by reference as if fully set forth.

BACKGROUND

This invention generally relates to wireless hybrid time division multiple access/code division multiple access communication systems. More particularly, the present invention relates to measuring interference signal code power in such systems.

A measurement commonly used in hybrid time division multiple access (TDMA)/code division multiple access (CDMA), such as time division duplex (TDD)/CDMA or time division synchronous code division multiple access (TD-SCDMA) wireless communication systems is interference signal code power (ISCP). ISCP is a measure of the interference in a particular time slot. This measurement has many applications, such as for time slot and channel assignments for the system's users.

FIG. 1 is a simplified diagram of an ISCP measuring device of a radio frequency (RF) receiver 30. To allow the automatic gain control (AGC) 12 to settle, the AGC 12 is turned on slightly prior to the midamble portion of a communication burst. This time period is typically 50 chips prior to the midamble. The midamble is the portion of a communication burst containing known training sequences.

The midamble is received by an antenna 10 or antenna array. The AGC 12 normalizes the power level of the received RF signals. A sampling device 14 samples the received signals at the chip rate or a multiple of the chip rate. A midamble processing device 16 processes the received signals with a code associated with the receiver's midamble code(s). Using information from the midamble processing and the control value of the AGC 12 (representing the AGC gain), an ISCP calculation device 18 determines the ISCP measurement.

A drawback to measuring the ISCP in this manner is the processing power required. The midamble processing and the ISCP calculation require considerable processing power and receiver on time. By reducing the processing power and receiver on time, power usage for a user equipment is reduced and, accordingly, battery power consumption is reduced. The reduced battery power consumption extends the battery life of the user equipment.

Accordingly, it is desirable to have other approaches to calculating ISCP.

SUMMARY

An interference signal code power (ISCP) measurement is estimated in a time division multiple access/code division multiple access communication system. Signals transmitted in a particular time slot are received. A power level of the transmitted received signals of the particular time slot is measured. An association of ISCP values with measured power levels is provided. The measured power level is used to estimate an ISCP value. The estimated ISCP value is associated with that measured power level.

BRIEF DESCRIPTION OF THE DRAWING(S)

DETAILED DESCRIPTION OF THE PREFERRED EMBODIMENT(S)

Figure 1:
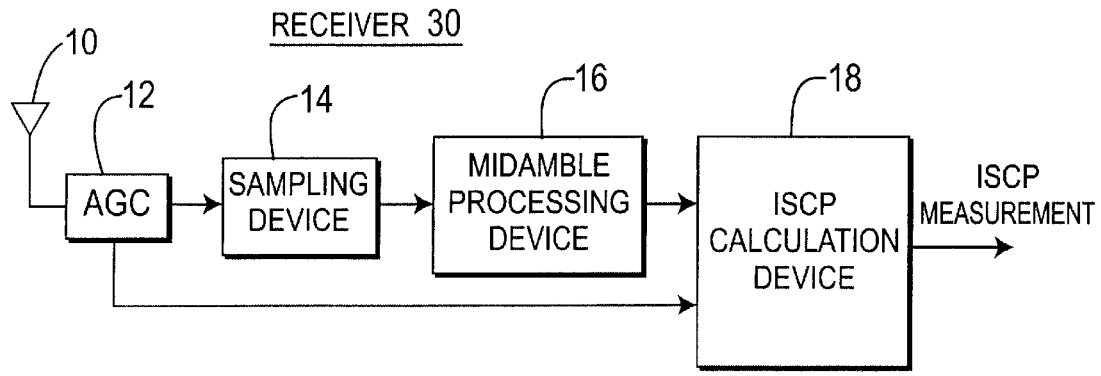
FIG. 1 is a simplified block diagram of a receiver making an ISCP measurement.
Figure 2A:
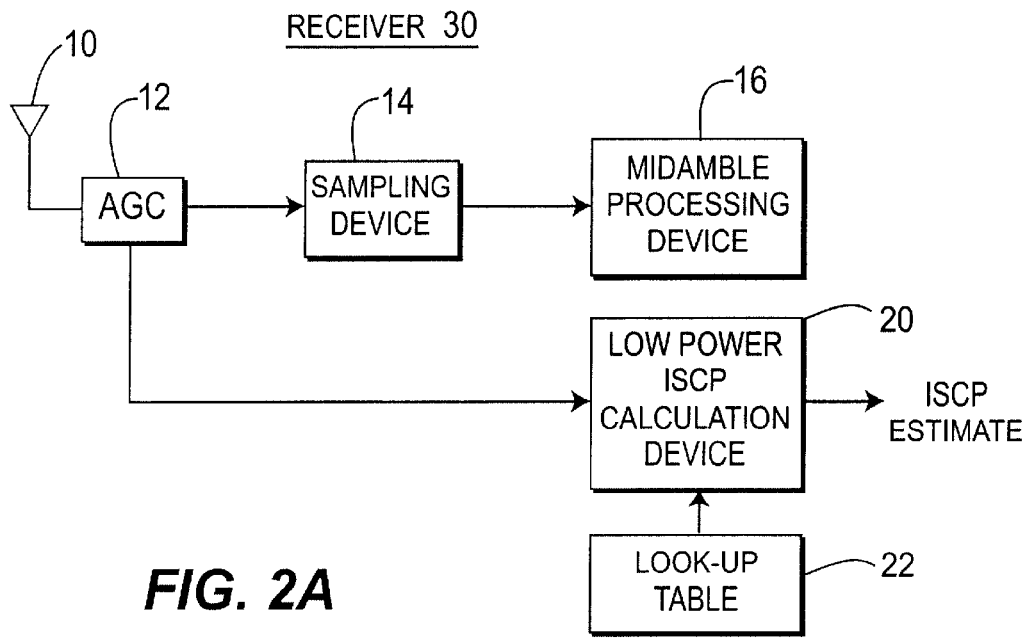
FIGS. 2A and 2B are simplified block diagrams of a receiver making a low power ISCP measurement.
Figure 2B:
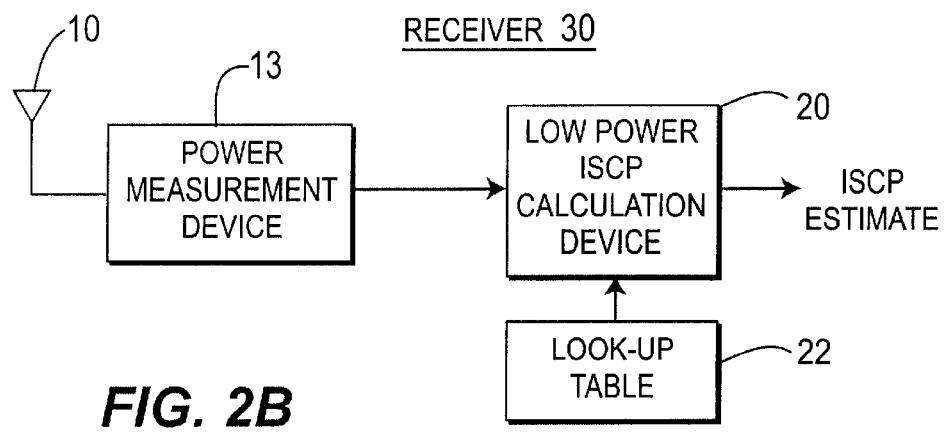

FIGS. 2A and 2B are illustrations of a low power ISCP measuring device of a receiver 30. The low power ISCP measuring device can be used at a user equipment, base station or both. Preferably, it is used at the user equipment to reduce battery power consumption.

Instead of processing the entire midamble to determine the ISCP, the low power ISCP measuring device primarily uses a power measurement of the timeslot in the ISCP calculation. As shown in FIG. 2A, the power measurement is the control value of the AGC 12. By only using the AGC control value, the receiver 30 only needs to operate until the AGC 12 settles, reducing the processing power required by the receiver.

The midamble is received by an antenna 10 or antenna array of the receiver 30. The AGC 12 normalizes the power level of the received RF signals. Since only the control value of the AGC 12 is required, the AGC 12 does not have to settle prior to reception of the midamble. Although the AGC 12 can be turned on prior or any time during the midamble, preferably, the AGC is started at the beginning of the midamble. After the AGC 12 settles, the receiver components are turned off to reduce power consumption. Since a typical AGC 12 settles in roughly 50 chips, the receiver components 12, 14, 16 are only on for a short period of time. For a user equipment, this extends the battery life. The control value of the settled AGC 12 is sent to a low power ISCP calculation device 20. Using the control value, the calculation device 20 determines an ISCP estimate.

Alternately, as shown in FIG. 2B, the power measurement is determined by a power measurement device 13. Transmitted signals in the time slot of interest are received by an antenna 10 or antenna array of the receiver 30. A power measurement device 13 measures a power level of the transmitted signals. Using the power measurement, the ISCP calculation device 20 determines an ISCP estimate.

One approach to associate the control value with an ISCP value is fixed processing performance estimation. Assuming a typical AGC performance, a table associating ISCP values with AGC controls values is used to generate ISCP estimates. Alternately, for power measurements, a table associating ISCP values with power measurements is used to generate ISCP estimates. To further refine the accuracy in the determined ISCP value, additional variables may be incorporated into the look up table 22. These variables include: received signal code power (RSCP), the temperature of the receiver, the radio frequency that the measurement is being made and the location of the receiver (for user equipments), such as being in an active cell or a public service telephone network (PSTN). The look up table 22 may be based on any combination of these variables.

The look up table 22 may also be derived by the receiver's own performance. Each user equipment or base station may be tested and the gain control value or power measurements for various ISCP values are determined. A look up table 22 is generated based on the test results. Potential variables for the look-up table 22 in addition to the AGC control value or the power measurement may also include: RSCP, the temperature of the receiver, the radio frequency that the measurement is being made, the location of the receiver (for user equipments), such as being in an active cell or a public service telephone network (PSTN), or any combination of these variables.

Figure 3A:
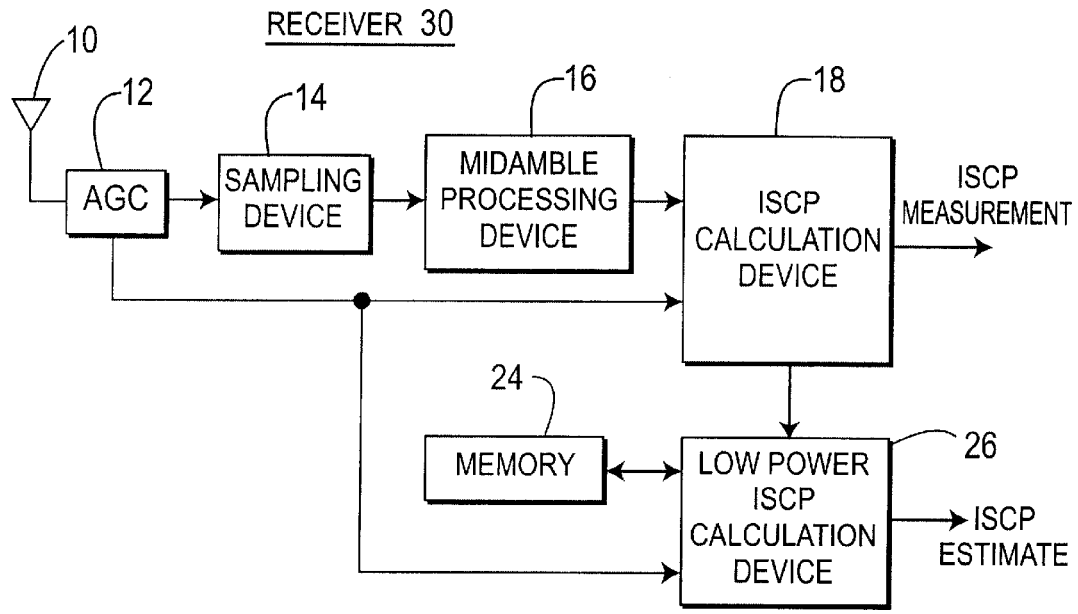
FIGS. 3A and 3B are simplified block diagrams of a receiver using ISCP measurements to produce future ISCP estimates.
Figure 3B:
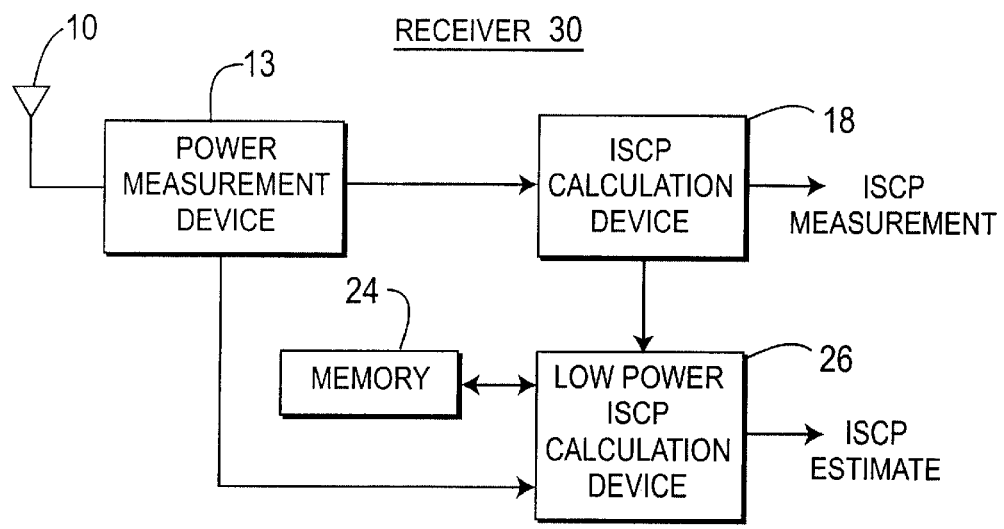

Another approach to estimate the ISCP is dynamic estimation as shown in FIGS. 3A and 3B. The receiver occasionally takes ISCP measurements using the sampling device 14, the midamble processing device 16 and the ISCP calculation device 18, as described previously in conjunction with FIGS. 2A and 2B. The AGC control values or power measurement values are stored in a memory 24 associated with the low power ISCP calculation device 26 along with measured ISCP calculation. Using these measurements, future ISCP estimations are made using the low power ISCP calculation device to derive the ISCP estimate using the AGC control/power measurement value, without the need for midamble processing. Using the AGC control/power measurement value, an ISCP estimate can be taken from previously measured values. The previously measured values may be previous values for the time slot of interest or for all the time slots. Alternately, the time slots may be grouped together, where measurements for any time slot in a group can be used for another time slot in the group. Interpolation can be used for missing values. To increase the accuracy of the stored values, several stored measurements may be combined into one cumulative measurement, such as by using a sliding average or a block average for a particular time slot.

The preferred implementation periodically interlaces actual measurements with estimated measurements. This implementation allows for a tradeoff between accuracy and power utilization. One such approach takes one actual measurement for three ISCP estimates.

To in crease the reliability of the stored measurements, the measurements may be indexed by other variables, such as RSCP, the temperature of the receiver, the radio frequency that the measurement is being made, the location of the receiver (for user equipments), such as being in an active cell or a public service telephone network PSTN), or any combination of these indexes. For the measured AGC control value, an estimated ISCP is selected based on the indexed criteria.

To generate the initial values in the memory, the receiver 30 may be allowed to accumulate actual measurements for a certain duration. After that certain duration, the receiver 30 switches to an interleaved periodic approach. Alternately, the memory 24 is initially filed with ISCP estimates based on the receiver's predicted performance under typical conditions. Over time, the interleaved ISCP measurements will replace the predicted values.

What is claimed is:

1. A method for estimating an interference signal code power (ISCP) measurement for a receiver in a hybrid time division multiple access/code division multiple access communication system, the method comprising:
   receiving signals transmitted in a particular time slot;
   measuring a power level of the transmitted received signals of the particular time slot;
   providing an association of ISCP values with measured power levels; and
   using the measured power level to estimate an ISCP value, the estimated ISCP value associated with that measured power level.

2. The method of claim 1 wherein the measured power level is an automatic gain control (AGC) value of an AGC device processing received midambles of the transmitted received signals.

3. The method of claim 1 wherein the association is derived from previously measured ISCP values.

4. The method of claim 1 wherein the association is derived from testing the receiver at various ISCP values.

5. The method of claim 2 wherein the association is based on a model associating AGC control values for the receiver with ISCP values.

6. The method of claim 1 wherein the estimating the ISCP value uses at least one of: received signal code power, receiver temperature, radio frequency of a transmission of a midamble and receiver location.

7. A user equipment comprising:
   an antenna receiving signals transmitted in a particular time slot in a wireless hybrid time division multiple access/code division multiple access format;
   a power measurement device for measuring a power level of the transmitted received signals of the particular time slot;
   a look-up table for providing an association of interference signal code power (ISCP) values with measured power levels; and
   a low power ISCP calculation device using the measured power level to estimate an ISCP value, the estimated ISCP value associated with that measured power level.

8. The user equipment of claim 7 wherein the power measurement device is an automatic gain control (AGC) and the measured power level is an AGC control value.

9. The user equipment of claim 7 wherein the association is derived from previously measured ISCP values as measure by an ISCP calculation device.

10. The user equipment of claim 8 further comprising a midamble processing device for processing received midambles of the transmitted received signals, wherein the ISCP calculation device measures ISCP using an output of the midamble processing device.

11. The user equipment of claim 7 wherein the association is derived from testing the user equipment at various ISCP values.

12. The user equipment of claim 7 wherein the low power ISCP calculation device estimates the ISCP value using at least one of: received signal code power, receiver temperature, radio frequency of a transmission of a midamble and receiver location.

13. A base station comprising:
   an antenna receiving signals transmitted in a particular time slot in a wireless hybrid time division multiple access/code division multiple access format;
   a power measurement device for measuring a power level of the transmitted received signals of the particular time slot;
   a look-up table for providing an association of interference signal code power (ISCP) values with measured power levels; and
   a low power ISCP calculation device using the measured power level to estimate an ISCP value, the estimated ISCP value associated with that measured power level.

14. The base station of claim 13 wherein the power measurement device is an automatic gain control (AGC) and the measured power level is an AGC control value.

15. The base station of claim 13 wherein the association is derived from previously measured ISCP values as measure by an ISCP calculation device.

16. The base station of claim 14 further comprising a midamble processing device for processing a received midamble, wherein the ISCP calculation device measures ISCP using an output of the midamble processing device.

17. The base station of claim 13 wherein the association is derived from testing the base station at various ISCP values.

18. The base station of claim 13 wherein the low power ISCP calculation device estimates the ISCP value using at least one of: received signal code power, receiver temperature, radio frequency of a transmission of a midamble and receiver location.

* * * * *

UNITED STATES PATENT AND TRADEMARK OFFICE
CERTIFICATE OF CORRECTION

PATENT NO.    : 6,826,411 B2
DATED         : November 30, 2004
INVENTOR(S)   : Dick et al.

It is certified that error appears in the above-identified patent and that said Letters Patent is hereby corrected as shown below:

Column 3,
Line 34, after "To", delete "in crease" and insert -- increase --.
Line 39, after "network", delete "PSTN)" and insert -- (PSTN) --.

Signed and Sealed this

Seventeenth Day of January, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,826,411 B2 |
| APPLICATION NO. | : 10/325805 |
| DATED | : November 30, 2004 |
| INVENTOR(S) | : Dick et al. |

It is certified that error appears in the above-identified patent and that said Letters Patent is hereby corrected as shown below:

ON THE TITLE PAGE:

item (56), page 1, right column, FOREIGN PATENT DOCUMENTS, line 1, delete "CN 1329789 10/2002", and insert therefore --CN 1329789 01/2002--.

Signed and Sealed this

Twenty-second Day of August, 2006

JON W. DUDAS
*Director of the United States Patent and Trademark Office*